(12) United States Patent
Crookston

(10) Patent No.: US 7,422,096 B2
(45) Date of Patent: Sep. 9, 2008

(54) EXTENSION FOR CONVEYOR

(76) Inventor: Anthony J. Crookston, 250 S. Van Buren Ave., Barberton, OH (US) 44203

( * ) Notice: Subject to any disclaimer, the term of this patent is extended or adjusted under 35 U.S.C. 154(b) by 178 days.

(21) Appl. No.: 11/284,707

(22) Filed: Nov. 22, 2005

(65) Prior Publication Data
US 2006/0070845 A1    Apr. 6, 2006

Related U.S. Application Data

(63) Continuation-in-part of application No. 10/713,814, filed on Nov. 14, 2003, now Pat. No. 6,966,418.

(51) Int. Cl.
*B65G 15/00* (2006.01)

(52) U.S. Cl. .................. 198/346; 198/313; 198/315; 198/312; 414/10; 414/508; 414/523

(58) Field of Classification Search ........... 198/312, 198/313, 315, 316, 1, 346; 414/10, 508, 414/523
See application file for complete search history.

(56) References Cited

U.S. PATENT DOCUMENTS

| | | | | |
|---|---|---|---|---|
| 1,015,939 A | * | 1/1912 | Brunelle | 198/313 |
| 2,708,998 A | * | 5/1955 | Ulinski | 198/311 |
| 2,967,602 A | * | 1/1961 | Mosier | 198/316.1 |
| 3,051,295 A | * | 8/1962 | Moy | 198/313 |
| 3,088,609 A | * | 5/1963 | Franzen | 414/508 |
| 3,204,788 A | * | 9/1965 | Kleinsorge | 414/523 |
| 3,227,296 A | * | 1/1966 | Marks | 414/508 |
| 3,244,299 A | * | 4/1966 | Girardi | 414/523 |
| 3,454,173 A | * | 7/1969 | Martin | 414/344 |
| 3,523,404 A | * | 8/1970 | Girardi | 53/391 |
| 3,825,107 A | * | 7/1974 | Cary et al. | 198/313 |
| 4,074,802 A | * | 2/1978 | Hudis | 198/315 |
| 4,366,900 A | * | 1/1983 | Johansson | 198/817 |
| 4,793,437 A | * | 12/1988 | Hanthorn | 182/102 |
| 5,669,562 A | * | 9/1997 | Smith | 241/101.74 |
| 5,685,687 A | * | 11/1997 | Frye | 414/505 |
| 6,447,234 B2 | * | 9/2002 | Sinn et al. | 414/398 |

* cited by examiner

*Primary Examiner*—Gene O. Crawford
*Assistant Examiner*—Rashmi K Sharma
(74) *Attorney, Agent, or Firm*—Hahn Loeser & Parks, LLP; W. Edward Crooks

(57) ABSTRACT

A conveyor for transporting materials or people from a first location to a second location has an elongated boom having a first end, a second end, a top surface, and a bottom surface; a conveyor mechanism such as an endless belt, chain, or ladder that is operably attached to the elongated boom; and a plank platform operably attached to the boom adjacent to the bottom surface of the boom, wherein the platform is selectively pivotable from the boom and capable of providing a walking surface for the person unloading the conveyor. The platform may additionally or alternatively be at least partially extendible from one end of the elongated boom. The conveyor may be operably attached to a vehicle.

17 Claims, 13 Drawing Sheets

EXTENSION FOR CONVEYOR

CROSS REFERENCE TO RELATED APPLICATIONS

This application is a continuation-in-part of U.S. application Ser. No. 10/713,814, filed Nov. 14, 2003 now U.S, Pat. No. 6,966,418, the disclosure of which is incorporated herein by reference.

TECHNICAL FIELD

The present invention relates generally to conveyors. More particularly, the present invention relates to platform extensions for conveyors that extend and/or rotate from an end of the conveyor and aid the person unloading the conveyor.

BACKGROUND OF THE INVENTION

Many types of conveyors are widely known in the art. Conveyors typically comprise a fixed or articulated frame member, or boom, with an endless conveyor belt or chain located about the boom. Conveyors are generally used to transport materials, such as bundles of shingles and other roofing materials from, i.e., a truck to a rooftop. Another form of conveyor system that may be utilized in conjunction with the present invention is a latter truck, such as the latter trucks used by fire departments.

One inherent problem with conveyors involves the angle of the conveyor in relation to an upper surface, such as a roof. This problem is especially evident when transporting, e.g., shingles onto a residential housing roof or other pitched surface. Since the conveyor is angled upwardly when transporting materials, the end of the conveyor may be vertically-spaced from the roof surface. As such, the person unloading the conveyor may have to reach above his or her head to receive the materials carried by the conveyor. Additionally, pitched roofs render a person's footing unsafe, especially when removing heavy items from the conveyor.

There is a need for a conveyor that provides a more level and safer approach angle for the person unloading materials from the conveyor. Accordingly, the present invention is hereby submitted.

SUMMARY OF THE INVENTION

One advantage of the present invention is realized by providing a conveyor having a platform or plank extendible from one end of the conveyor.

Another advantage of the present invention is realized by providing a conveyor having a platform or plank that is selectively rotatable or pivotable from the main boom of the conveyor.

These and other advantages of the present invention are realized by providing a conveyor for transporting materials from a first location to a second location that comprises an elongated boom having a first end, a second end, a top surface, and a bottom surface; a conveyor mechanism such as an endless belt or chain that is operably attached to the elongated boom; and a plank or platform operably attached to the boom adjacent to the bottom surface of the boom, wherein the platform is selectively pivotable from the boom and capable of providing a walking surface for the person unloading the conveyor. The platform may additionally or alternatively be at least partially extendible from one end of the elongated boom. The platform may be attached to a platform support, with the platform support being slidably or rollably attached to the elongated boom.

DETAILED DESCRIPTION OF THE INVENTION

Figure 1:
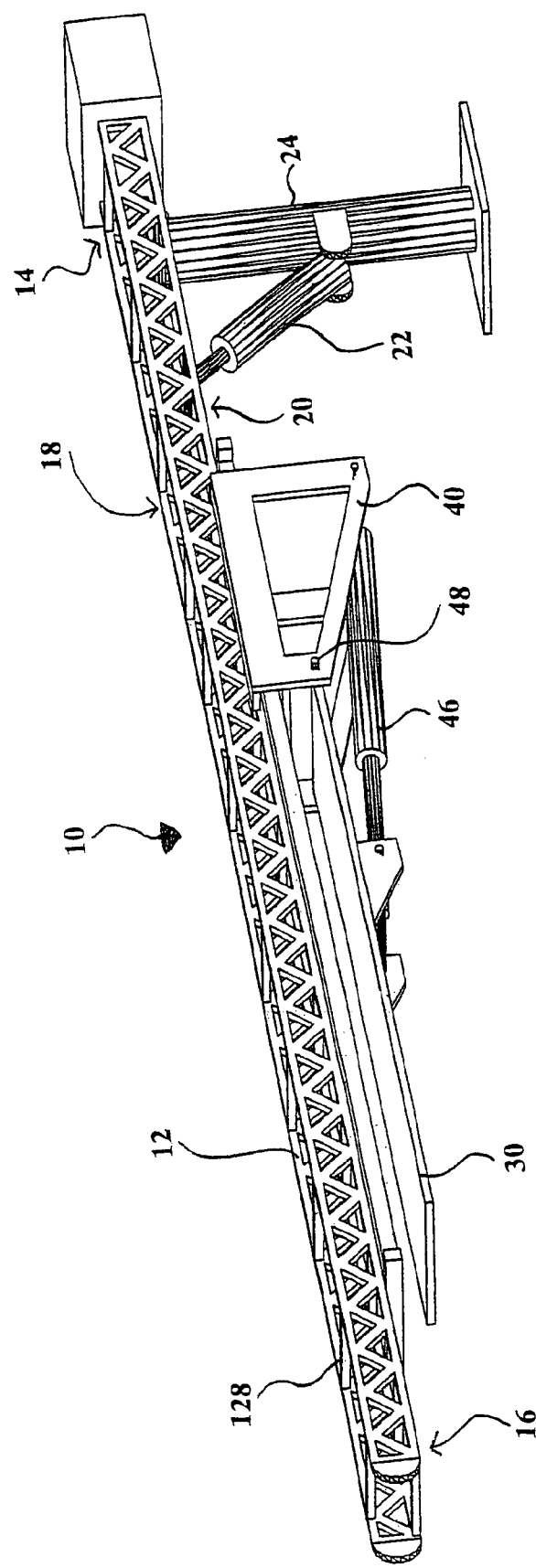
FIG. 1 is a perspective view of a conveyor with an extendible and pivotable platform, in accordance with a preferred embodiment of the present invention.

A preferred embodiment of a conveyor 10 is illustrated in FIG. 1. The conveyor 10 comprises a main boom 12 and conveyor mechanism 28, 128, such as a belt or chain. The main boom 12 comprises a first end 14 and a second end 16, and is attached to a base support. Preferably, the conveyor 10 comprises means for adjusting the pitch of the main boom 12 vertically and for translating the main boom 12 radially or horizontally. In a preferred embodiment, a rotatable pedestal 24 of a type known in the art is attached near the first end 14 to a base support. The rotatable pedestal 24 provides radial movement of the main boom 12. Rotatable pedestal 24 also preferably includes at least one hydraulic actuator 22 that facilitates movement of the main boom 12 vertically. As such, the main boom 12 is preferably adjustable both vertically and horizontally. The controls for the rotatable pedestal 24 and hydraulic actuator 22 are both of a type generally known in the art.

The main boom 12 additionally comprises upper or top surface 18 and lower or bottom surface 20. An endless conveyor mechanism 28, such as a belt, chain, or other structure known in the art may be operably attached to the main boom 12, such that materials to be transported are loaded onto the upper surface 18 of the main boom 12 near the first end 14. The materials are then conveyed toward the second end 16 of the main boom 12 and are unloaded accordingly. It is also contemplated that the main boom 12 may comprise a ladder device with rungs 128 in lieu of an endless conveyor mechanism 28.

Figure 2:
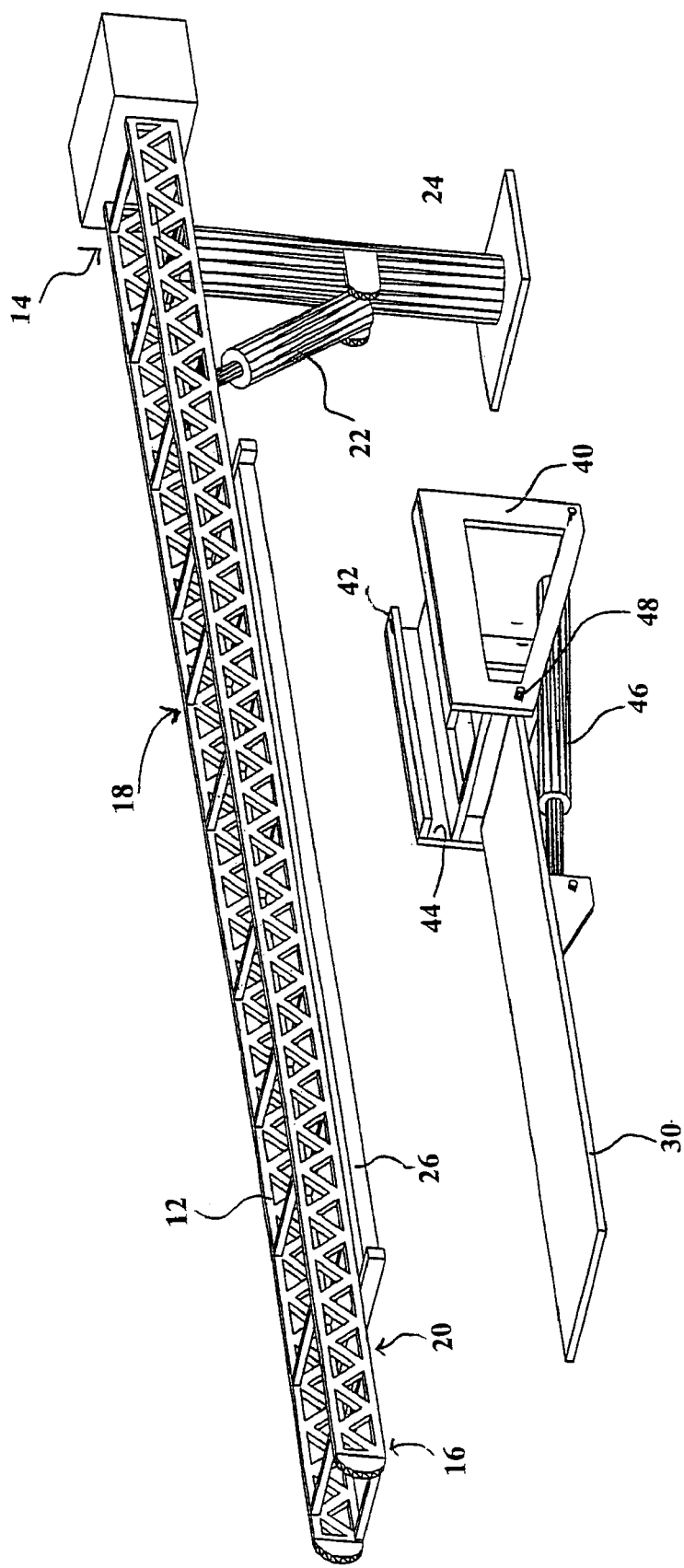
FIG. 2 is a perspective view of the conveyor of FIG. 1, shown with the platform and platform support detached from the boom
Figure 3:
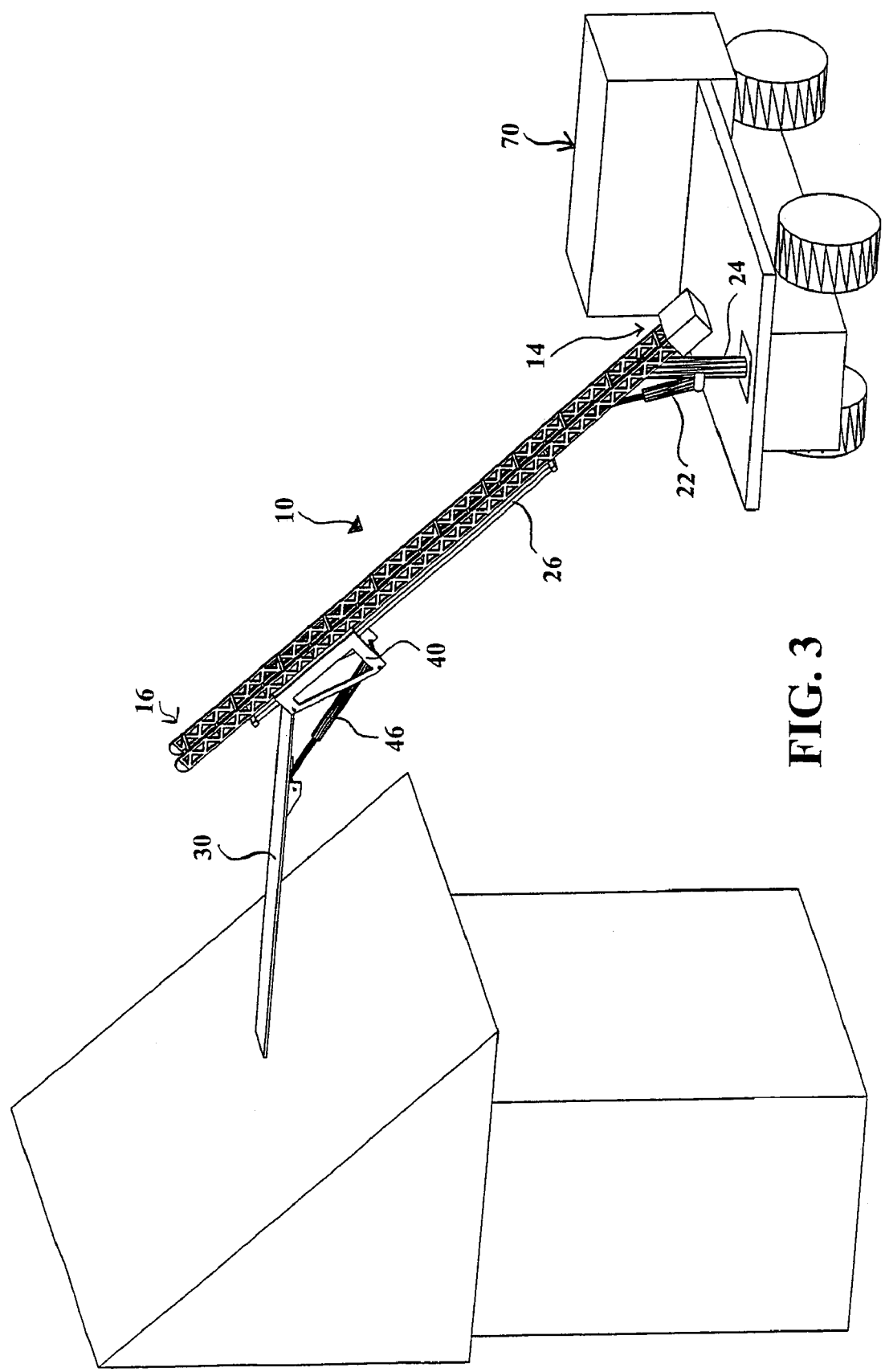
FIG. 3 is a perspective view of the conveyor of FIG. 1 attached to a vehicle and with the platform extended and pivoted downwardly.
Figure 4:
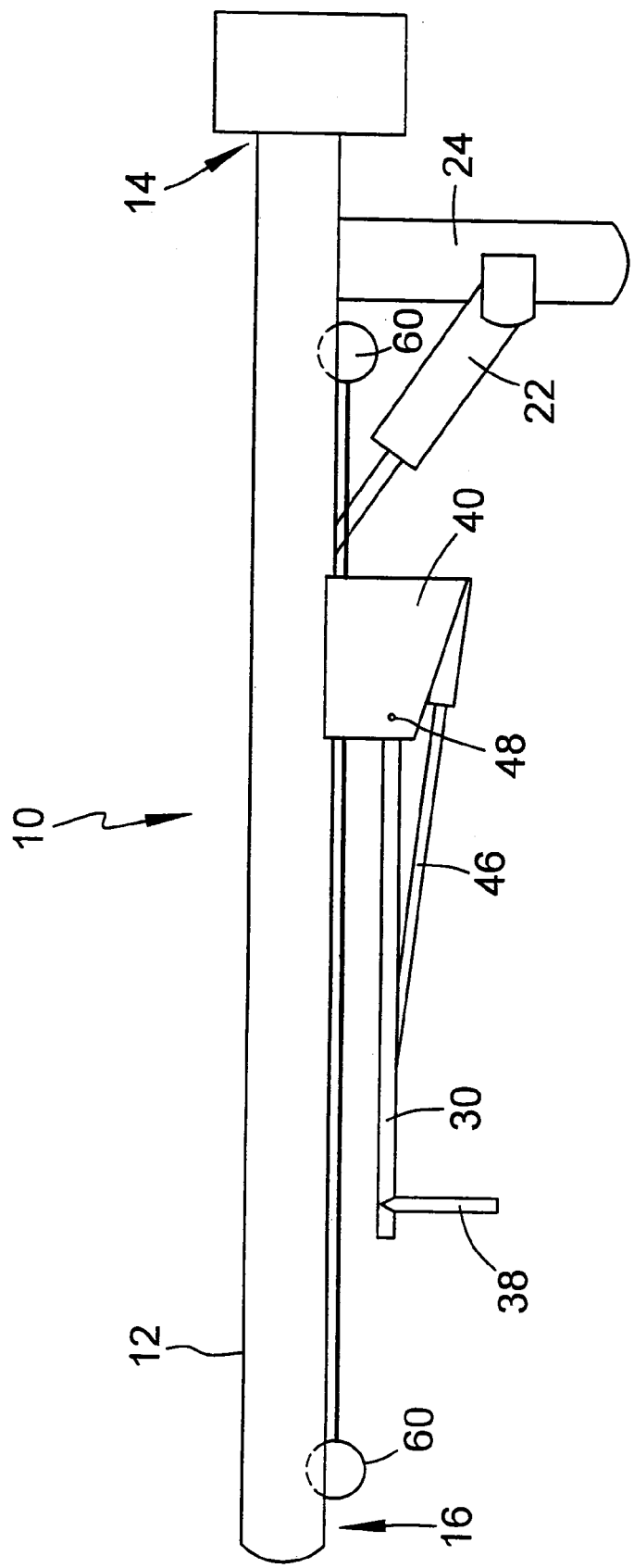
FIG. 4 is a side schematic view of the conveyor of FIG. 1.
Figure 5A:
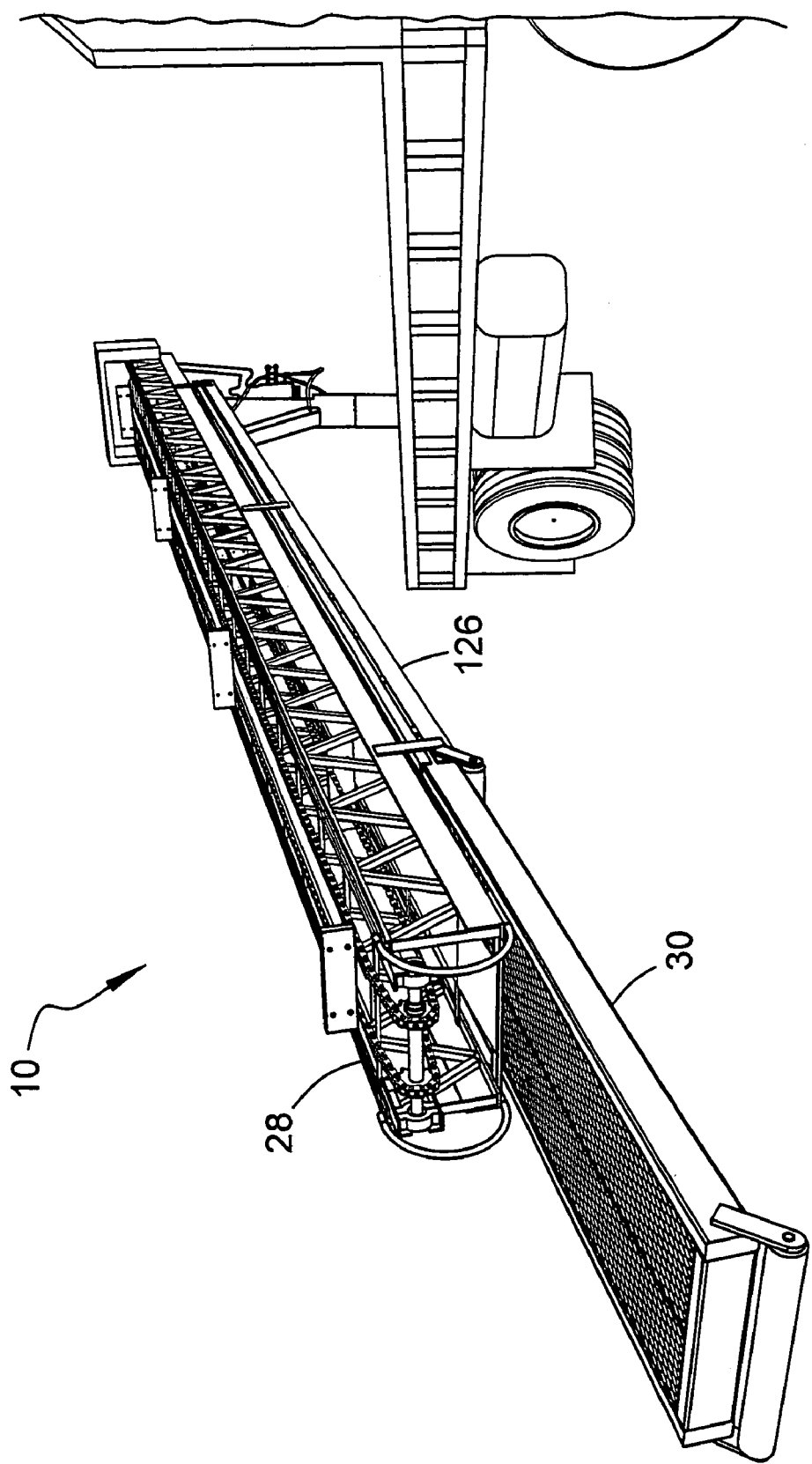
FIG. 5a is a perspective view of a second embodiment of a conveyor with a platform support track.
Figure 5B:
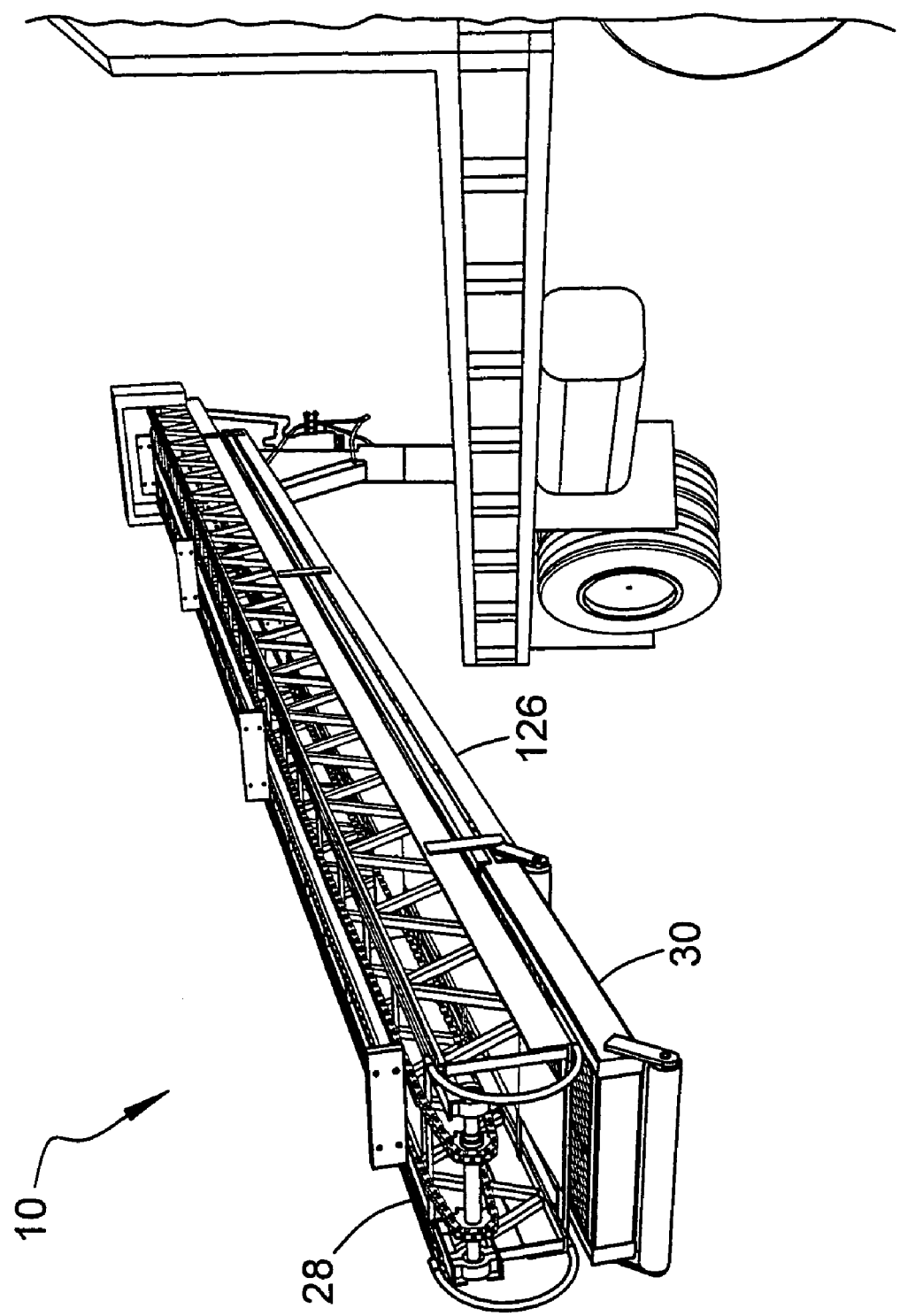
FIG. 5b is a perspective view of the conveyor of FIG. 5a, illustrated with the platform retracted.

Referring now to FIG. 2, the conveyor 10 further comprises platform 30, which may be extendable from the second end 16 and/or rotatable or pivotable downward from the main boom 12. Preferably, the platform 30 is of sufficient width to enable a person to walk across it. Additionally, the platform is preferably constructed of a rigid material such as steel or aluminum alloy, although any sufficiently rigid material can be utilized without deviating from the scope of the present invention.

The platform 30 is preferably pivotally attached at one end to a platform support, which in FIG. 2 is illustrated as carriage 40. The carriage 40 is preferably rollably or slidably attached to the main boom 12. In a preferred embodiment, the carriage 40 comprises inwardly-projecting flanges 42 that forms slots 44. Slots 44 receive outwardly-projecting flanges 26 on main boom 12. In such an embodiment, carriage 40 is slidably attached to boom 12. Alternatively, a plurality of rollers could be utilized instead of flanges 26, without deviating from the scope of the present invention. It is also contemplated that the carriage 40 may be fixed in relation to the boom, with the platform 30 being telescopically extendable.

The platform 30 is preferably rotatably attached to carriage 40 at or near one end of the platform 30, such that the platform is selectively pivotable downward. As such, the user can position the platform 30 to provide a more level walking surface for the person or persons approaching the main boom 12 to unload materials from the conveyor 10. Any rotatable connection as is known in the art may be utilized. A preferred embodiment for the rotatable connection comprises pins or rods 48 that are received in apertures (not shown) in the carriage 40. To facilitate rotation of the platform 30, a hydraulic actuator 46 may by attached to the carriage 40 on one end and to the underside of the platform on the other end, as illustrated in FIG. 2. In such an embodiment, retraction of the hydraulic actuator 46 causes downward rotation of the platform 30. In the same manner, extension of the hydraulic actuator 46 causes the platform to rotate upwardly back to a position substantially parallel to main boom 12.

Figure 6:
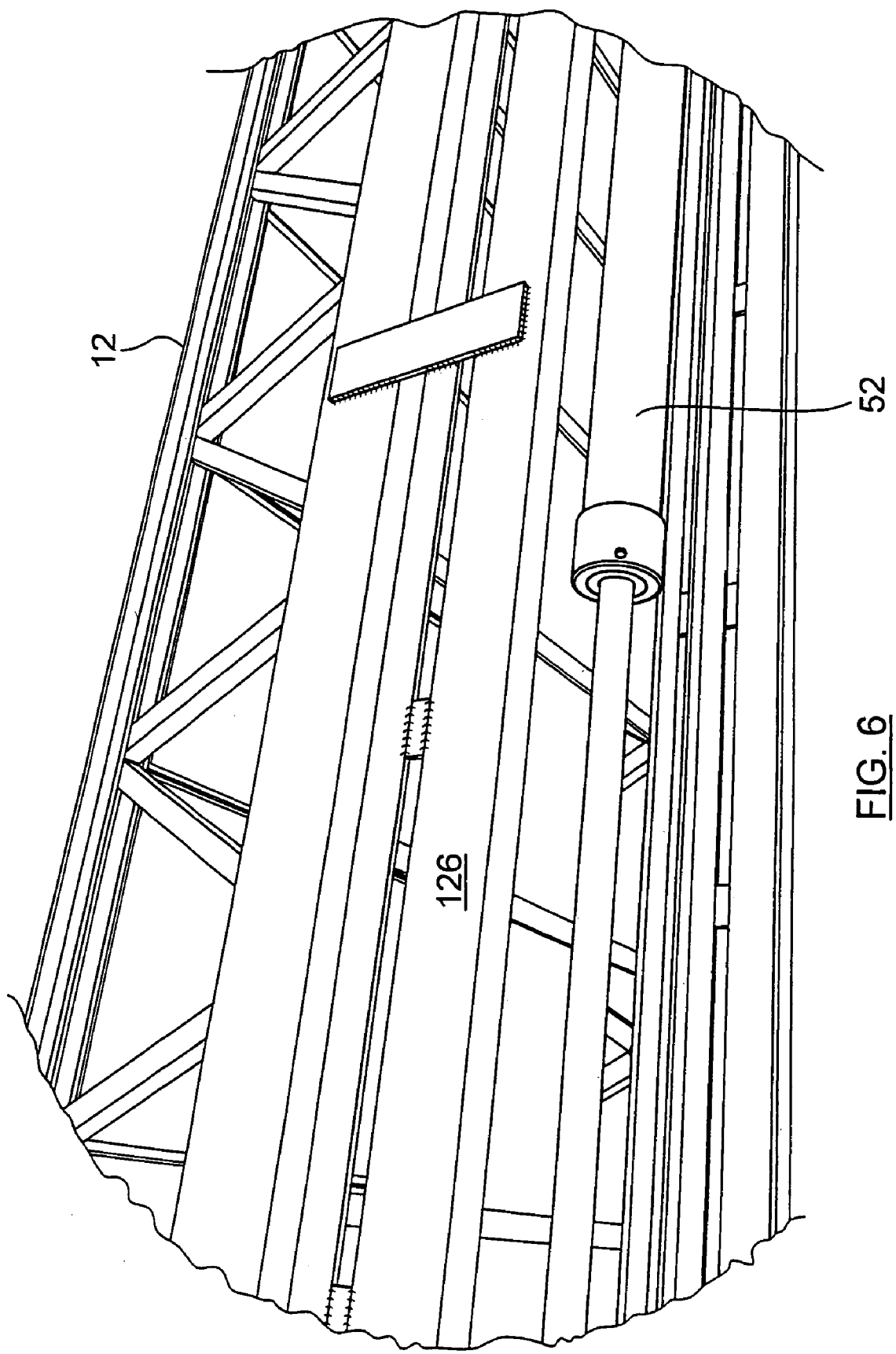
FIG. 6 is a close-up perspective view of a portion of the conveyor of FIG. 5a, showing the platform support track and a hydraulic cylinder for actuation of the platform.

Rather than carriage 40, it is also contemplated that the platform 30 may be slidably or rollably attached to the main boom by any suitable platform support as is known in the art, without deviating from the scope of the present invention. For example, the platform 30 may be supported by cage or track 126 and slidably or rollably extendible and retractable from the cage or track 126. In such an embodiment, illustrated in FIG. 6, the platform 30 may be rotatably attached to a drive member 50, such that after a predetermined critical distance of extension, when the joint between the platform and the drive member approaches the end of the cage or track 126, the platform passively rotates downwardly.

Additionally, the platform 30 may be slidably or rollably attached to an elongated support member attached to the main boom 12, such that the platform 30 is extendible and retractable along the length of the support member but not rotatable in relation to the support member. In such an embodiment, the support member, itself may be rotatable downwardly to adjust the angle of the platform 30.

Figure 7:
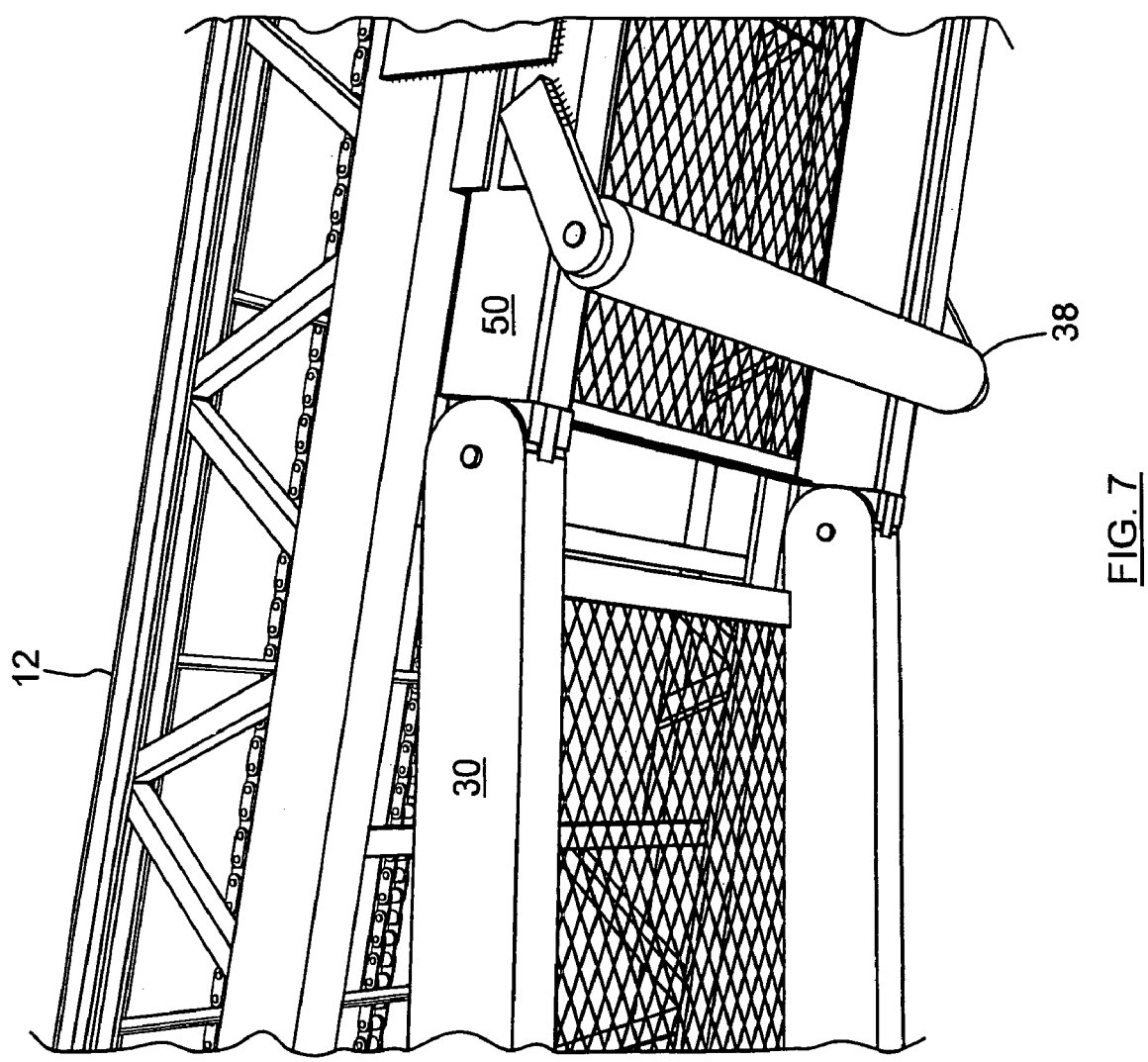
FIG. 7 is a close-up perspective view of a portion of the conveyor of FIG. 5a, showing a pivotable connection of the platform and a roller on the platform support track.
Figure 8:
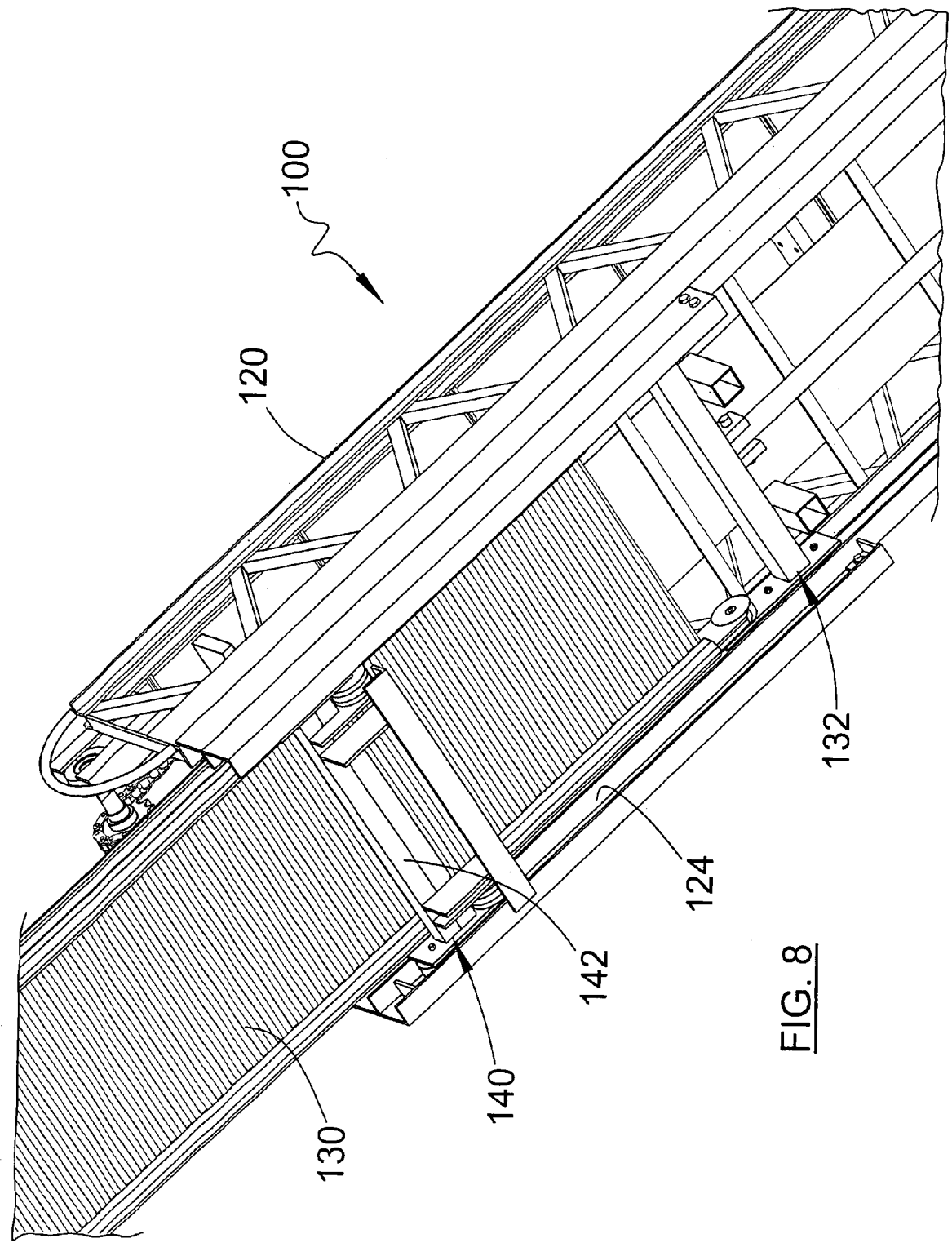
FIG. 8 is a perspective view of a portion of a third embodiment of a conveyor system.
Figure 9:
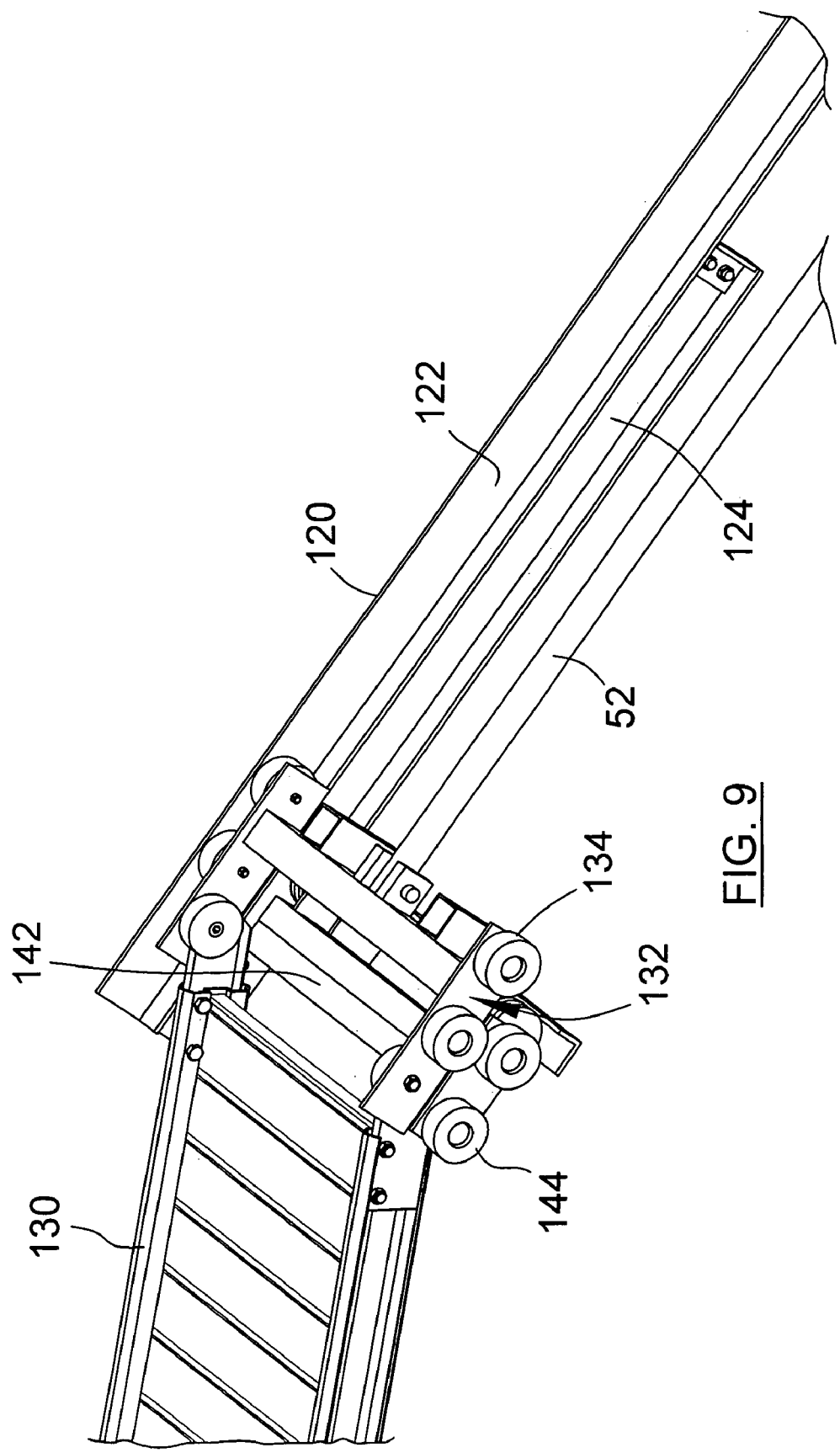
FIG. 9 is a top perspective view of the conveyor system of FIG. 8, illustrated with portion of the conveyor and boom removed.
Figure 10:
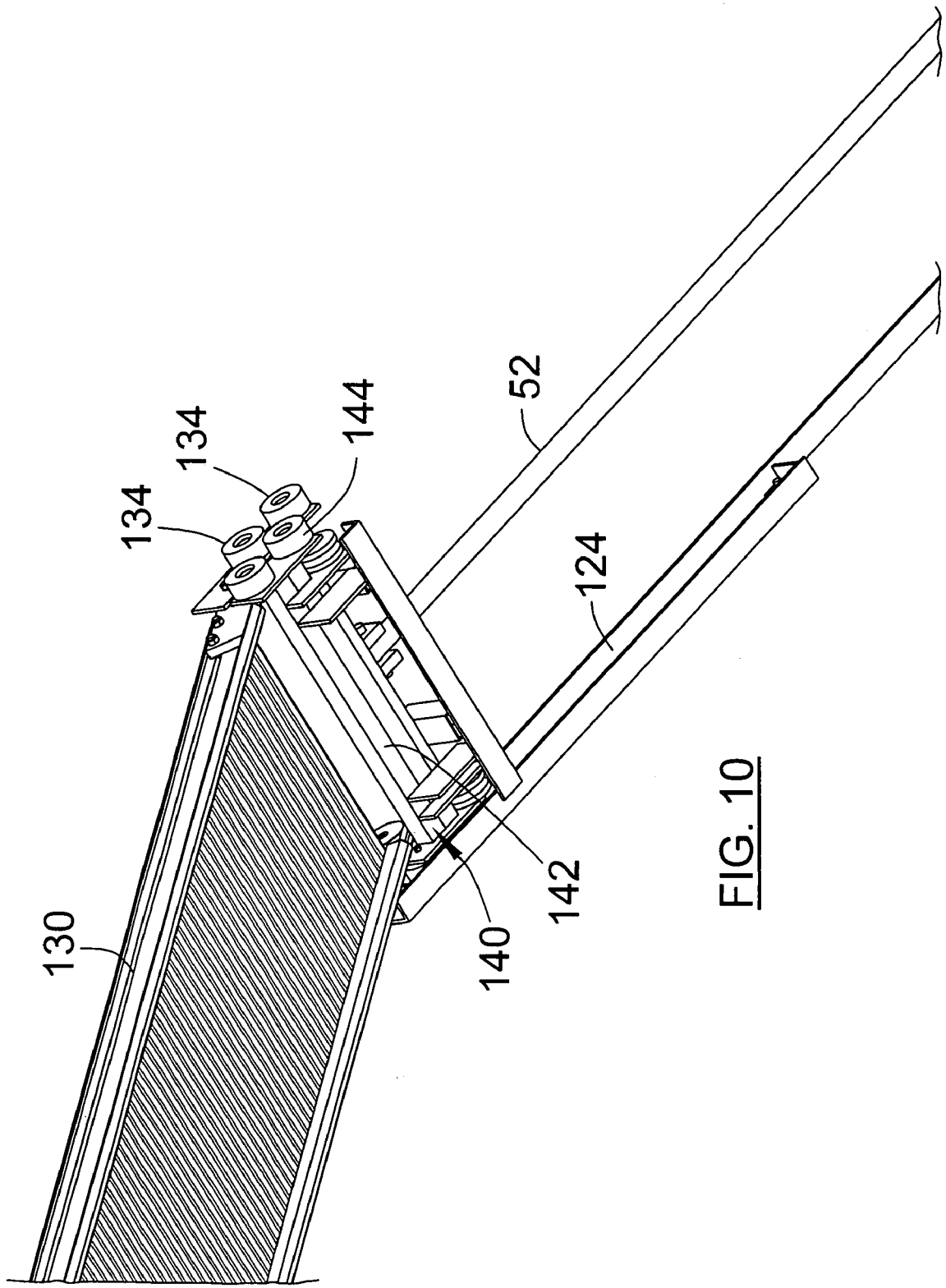
FIG. 10 is a bottom perspective view of the conveyor system of FIG. 8 illustrated with portions of the conveyor and boom removed.
Figure 11:
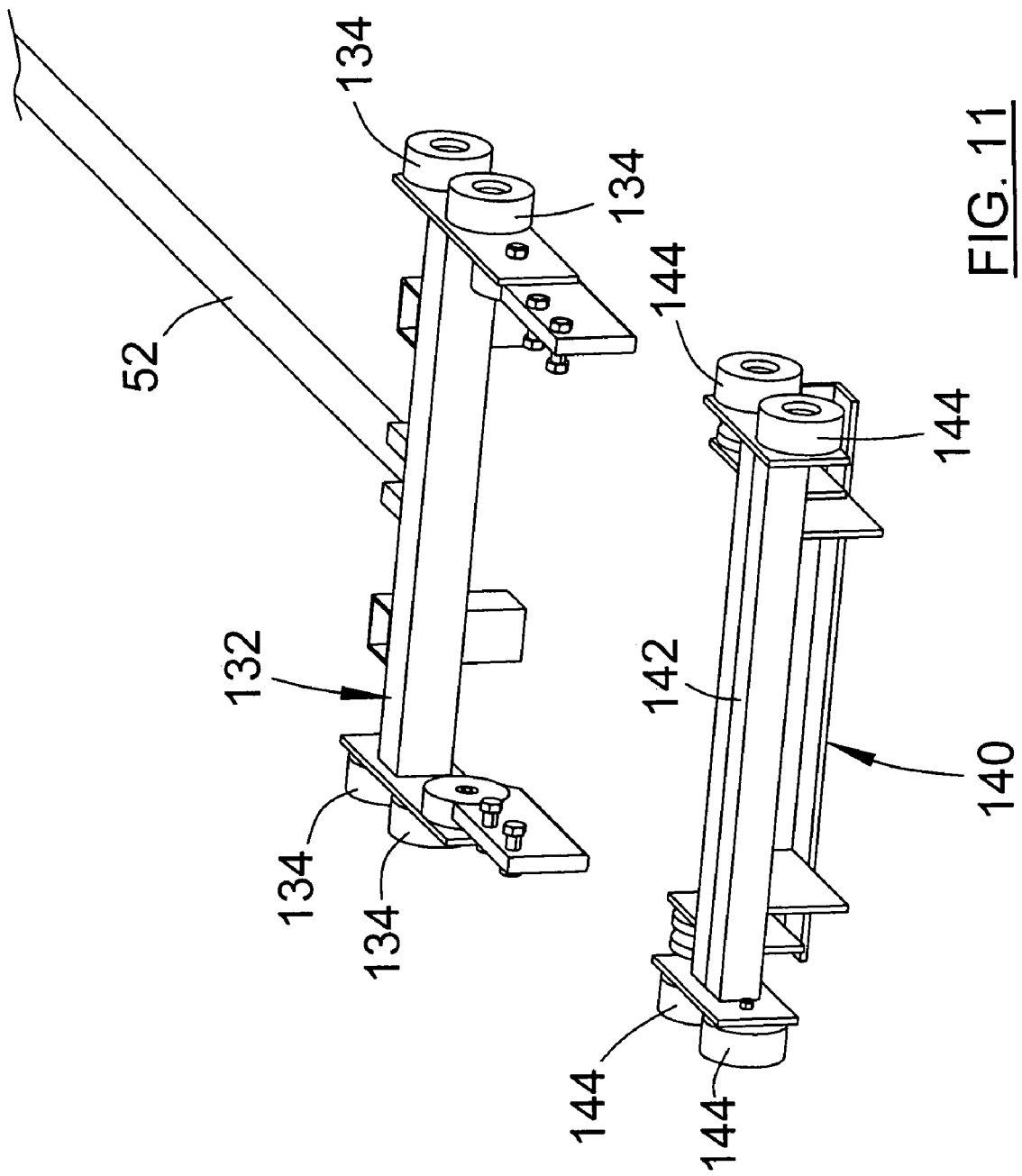
FIG. 11 is a perspective view of the upper trolley coupler and lower trolley supporter.

Extension and retraction of platform 30 is preferably hydraulically actuated. For example, carriage 40 may be translatable longitudinally in relation to the main boom 12 via opposing hydraulic winches 60 (FIG. 7) located at or near the ends of the main boom 12. To translate the platform 30, one winch 60 would wind its cable, while the opposing winch unwinds its cable. Alternatively, the hydraulic actuator may be a hydraulic cylinder 52 having its longitudinal axis substantially parallel to the main boom 12. Alternatively, extension and retraction of the platform 30 may be any other chain or winch drive as is known in the art. For example, opposing sides of the carriage 40 may be attached to chains or cables or the like. The chains or cables may additionally be attached to rotatable spools or drums, powered by any means known in the art, such that by winding the cable around one drum, while simultaneously unwinding the cable from the second drum translates the platform 30 forward or backward in relation to the main boom 12.

Optionally, platform 30 may further comprise at least one stabilizing member or leg 38. Stabilizing member 38 is preferably adjustable or rotatable downwardly in relation to platform 30. Optional stabilizing leg 38 may be used, for example, when only one side of the platform is touching a surface such as a roof.

In operation, the user first adjusts the elevation and direction of conveyor 10. The conveyor can either be fixed, manually moveable, or attached to a vehicle 70. After the elevation and direction of the conveyor 10 is selected, the user subsequently extends the platform 30 from the main boom 12 a predetermined distance, preferably via a hydraulic winch 60, hydraulic cylinder 52, or other chain or cable drive. After the platform 30 extends from the main boom 12 a predetermined distance, the user next rotates the platform 30 downwardly, with the end of the platform 30 resting on, if possible, a roof or other upper surface. It should be understood that if the platform 30 is extendible from a rotatable platform support, the user would rotate the platform support, itself, either before or after extension of the platform 30. Additionally, if the platform 30 is passively rotatable downwardly after extension a predetermined distance, the user only needs to extend the platform a predetermined distance to facilitate its rotation downwardly.

If the platform 30 is angled such that only one side of the platform 30 is touching the roof, optional support leg 38 can be engaged downwardly to ensure that both sides of the platform 30 are supported by the roof.

An additional embodiment of conveyor 100 is illustrated in FIGS. 8-11. Conveyor 100 may comprise elongated boom 120 that includes opposed upper tracks 122 or other supports that contribute to the support of platform 130. Upper trolley coupler 132 or any other coupler known in the art may extend between, and be received within, the opposed upper tracks 122, and may be operably attached to platform 130 on one end. In the embodiment shown, platform 130 is rotatably attached to upper trolley coupler 132. However, it is contemplated that platform 130 could be fixedly attached to upper trolley coupler 132. Upper trolley coupler 132 is also attached to, for example, a hydraulic actuator 52, which translates the upper trolley coupler 132 and platform 130 relative to the boom 120. Upper trolley coupler 132 may include rollers 134 or any other devices known in the art that are received in upper track 122 to provide support for the platform while providing smooth translation of the platform 130 relative to the boom 120. It is also contemplated that the hydraulic actuator 52 may be attached directly to the platform 130, and platform 130 may be attached to rollers.

As illustrated in FIGS. 8-11, conveyor system 100 may comprise opposed lower tracks 124. Lower trolley supporter 140 may comprise a transverse member 142 that extends between, and is received within, opposed lower tracks 124. Lower trolley supporter 140 may be selectively translatable within the opposed lower tracks 124 in the direction of the axis of the boom 120, and may include rollers 144 or any other devices known in the art that are received in the opposed lower tracks 124 to provide support to lower trolley supporter 140 while providing smooth translation of the lower trolley 140 relative to the boom 120. It is contemplated that any support known in the art could be utilized instead of the trolley supporter 140 illustrated.

As indicated, the platform 130 is preferably rotatably attached to upper trolley 132 or other coupler. As lower trolley supporter 140 is positioned below the platform 130 and is translatable, the lower trolley supporter 140 provides an adjustable pivot point for platform 130. When the lower trolley supporter 140 is positioned nearest the end of the boom 120, the pivot point of the platform 130 will be nearest the same end. As the lower trolley 140 is translated toward the middle of the boom 120, the pivot point of the platform 130 is likewise moved toward the middle of the boom 120. In the embodiment shown, the lower trolley 140 is passively translatable by the movement and force of the platform as it translates. However, it is contemplated that the lower trolley 140 may have its own independent power and controls, such as a hydraulic actuator and accompanying controls. In that manner, the pivot point of the platform 130 could be dynamic and adjustable without requiring translation of the platform forward or backward.

In the embodiment shown, when the platform 130 is extended, lower trolley 140 is translated in the same direction by the friction that exists between the platform 130 and the lower trolley supporter 140. The lower trolley supporter 140 may be translated until it reaches its forwardmost extent. After the platform 130 is extended and, for example, pivoted downward, rearward translation of the platform 130 also translates the lower trolley 140 rearward, thereby moving the pivot point of the platform 130 rearward as well, until the lower trolley 140 reaches its rearwardmost extent, as determined by the extent of the opposed lower tracks 124. At this point, further retraction of platform 130 will result in the platform 130 pivoting upward until it is substantially parallel to the boom 120.

Figure 12:
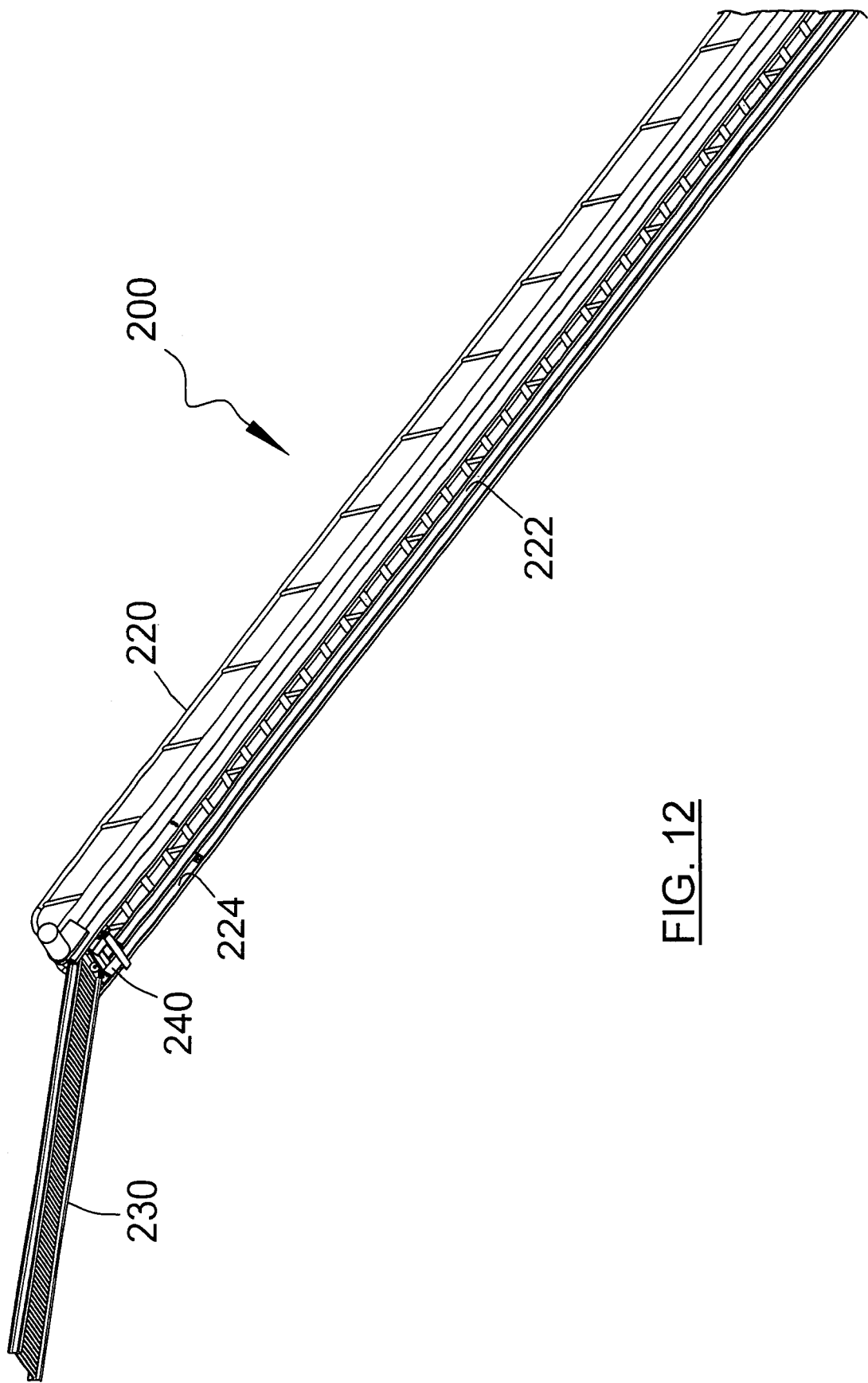
FIG. 12 is a perspective view of a fourth embodiment of a conveyor system.

A still further embodiment of extendable and/or pivotable conveyor system 200 is illustrated in FIG. 12. As illustrated, conveyor 200 may include a platform 230 that is advantageous when in combination with a ladder or ladder truck as is commonly known. It is contemplated that any of the disclosed embodiments in FIGS. 1-9 could be utilized with such a ladder or ladder truck. It is also contemplated that the ladder may be a one-piece or fixed ladder, or may be a telescopic or multi-piece ladder. In operation, the platform 230 may be similarly nestible completely beneath the ladder, adjacent to the underside of the free end or distal portion of the ladder. It is contemplated that the extendible and/or pivotable platform would be useful for rescuing fire victims from taller buildings. As the ladder may be extended at an angle, the platform 230 could be adjusted to be horizontal, such that it could be inserted within, for example, a window. The fire victim could crawl out of the building onto the platform 230.

It is also contemplated that the platform 230 may have foldable or retractable handles or hand rails that could assist the individual in walking or crawling on the platform. Additionally, the distal portion of the ladder may devoid of rungs for a selected distance rather than extending entirely to the end of the boom. Preferably, the ladder may be devoid of rungs at or near a pivot point of the platform 230, such that a person on the ladder 220 could climb the ladder and then walk straight out onto the platform. In this manner, the individual moving from the platform 230 onto the ladder could also easily make the transition.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A conveyor system, comprising:
   a boom having a first end, a second end, a top surface, a bottom surface, and means for conveying; and,
   a platform operably attached to the boom adjacent to the bottom surface of the boom by a platform support, wherein the platform is adjustably mounted from a first position substantially beneath the boom;
   means for at least partially extending the platform beyond the second end of the boom; and,
   means for pivoting the platform from the boom.

2. The conveyor system as recited in claim 1, wherein the platform support comprises a pair of opposed tracks.

3. The conveyor system as recited in claim 2, wherein the conveyor system further comprises a coupler that extends between the platform support tracks, the coupler being attached to a hydraulic actuator on one end and to the platform on the other end.

4. The conveyor system as recited in claim 3, wherein the coupler is translatable along the axis of the boom via the hydraulic actuator.

5. The conveyor system as recited in claim 3, wherein the platform is pivotably attached to the coupler.

6. The conveyor system as recited in claim 1, further comprising a transverse platform support member extending beneath the platform.

7. The conveyor system as recited in claim 6, wherein the transverse platform support member provides a pivot point for the platform.

8. The conveyor system as recited in claim 7, wherein the transverse platform support member extends between, and is received within opposed lower tracks.

9. The conveyor system as recited in claim 8, wherein the transverse platform support member is translatable along the axis of the opposed lower tracks.

10. The conveyor system as recited in claim 9, wherein the transverse platform support member is translated by the retraction and extension of the platform.

11. The conveyor system as recited in claim 1, wherein the means for conveying comprises a ladder.

12. The conveyor system as recited in claim 11, wherein the ladder is telescopic.

13. The conveyor system as recited in claim 11, wherein the ladder is operable attached to a vehicle.

14. The conveyor system as recited in claim 9, wherein the ladder is telescopic.

15. The conveyor system as recited in claim 1, wherein the means for conveying is an endless conveyor.

16. A conveyor system, comprising:
   a boom having a first end, a second end, a top surface, a bottom surface, and means for conveying;
   a platform operably attached to the boom adjacent to the bottom surface of the boom, the platform being adjustably mounted from a first position beneath the boom, is at least partially extendible beyond the second end of the boom, and is pivotable from the boom;
   a transverse platform support member extending beneath the platform, the transverse platform support member providing a pivot point for the platform; wherein,
   the transverse platform support member extends between, and is received within, opposed lower tracks and is translatable along the axis of the opposed lower tracks.

17. The conveyor system as recited in claim 16, wherein the transverse platform support member is translated by the retraction and extension of the platform.

* * * * *